US010699559B2

(12) United States Patent
Van Der Mark et al.

(10) Patent No.: US 10,699,559 B2
(45) Date of Patent: Jun. 30, 2020

(54) OPTICAL TRANSCEIVER, OPTICAL SYSTEM, INTERVENTIONAL DEVICE AND METHOD FOR SUPPLYING ENERGY AND RETURNING DATA

(71) Applicant: KONINKLIJKE PHILIPS N.V., Eindhoven (NL)

(72) Inventors: Martinus Bernardus Van Der Mark, Best (NL); Klaas Cornelis Jan Wijbrans, Rijen (NL); Gerhardus Wilhelmus Lucassen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/328,809

(22) PCT Filed: Sep. 4, 2017

(86) PCT No.: PCT/EP2017/072101
§ 371 (c)(1),
(2) Date: Feb. 27, 2019

(87) PCT Pub. No.: WO2018/042034
PCT Pub. Date: Mar. 8, 2018

(65) Prior Publication Data
US 2019/0213871 A1    Jul. 11, 2019

(30) Foreign Application Priority Data

Sep. 2, 2016    (EP) ..................................... 16186959

(51) Int. Cl.
*H04B 10/40* (2013.01)
*G08C 23/04* (2006.01)
(Continued)

(52) U.S. Cl.
CPC ............ *G08C 23/04* (2013.01); *H04B 10/225* (2013.01); *H04B 10/40* (2013.01); *H04B 10/807* (2013.01)

(58) Field of Classification Search
CPC ....... H04B 10/40; H04B 10/807; H04B 10/25
See application file for complete search history.

(56) References Cited

U.S. PATENT DOCUMENTS

| | | |
|---|---|---|
| 6,575,965 B1 | 6/2003 | Benett |
| 8,285,365 B2 | 10/2012 | Weiss |

(Continued)

FOREIGN PATENT DOCUMENTS

| | | |
|---|---|---|
| WO | 2008100208 A1 | 8/2008 |
| WO | 2014072891 A1 | 5/2014 |
| WO | 2017201000 A1 | 11/2017 |

OTHER PUBLICATIONS

Ramaswami, Rajiv et al Optical Networks: A Practical Perspective (2nd Ed), 2002, pp. 245-249.
(Continued)

*Primary Examiner* — Dzung D Tran

(57) ABSTRACT

The present invention relates to an optical transceiver, comprising an optical converter circuit (24) comprising an optoelectronic device (26), an electronic appliance (30) generating data, and circuitry (28) configured to control the optoelectronic device (26) and the electronic appliance (30). The optoelectronic device (26) is configured to, upon receiving an incoming optical beam, convert the optical beam into electrical energy. The optoelectronic device (26) is further configured to emit optical pulses, wherein emission of the optical pulses is induced by the incoming optical beam through photo-induced electro-luminescence (PIEL), wherein the optical pulses based on photo-induced electro-luminescence comprise the data generated by the electronic appliance (30). The circuitry (28) is configured to modulate (Continued)

the data onto the optoelectronic device (26) according to a multiple signal-level coding scheme causing the optoelectronic device (26) to emit the optical pulses in more than two different levels of a discrete set of optical intensities.

19 Claims, 7 Drawing Sheets

(51) Int. Cl.
*H04B 10/80* (2013.01)
*H04B 10/00* (2013.01)

(56) References Cited

U.S. PATENT DOCUMENTS

| | | | |
|---|---|---|---|
| 10,275,638 B1* | 4/2019 | Yousefpor | G06K 9/0002 |
| 2003/0073898 A1 | 4/2003 | Weiss | |
| 2004/0208415 A1* | 10/2004 | Kim | H01L 27/156 |
| | | | 385/14 |
| 2005/0011950 A1* | 1/2005 | Liedenbaum | G11B 7/005 |
| | | | 235/454 |
| 2011/0110669 A1 | 5/2011 | Guenter | |
| 2012/0197094 A1 | 8/2012 | Potenzone | |
| 2012/0239211 A1* | 9/2012 | Walker | G05B 13/021 |
| | | | 700/284 |
| 2014/0121648 A1 | 5/2014 | Weiss | |
| 2015/0071651 A1 | 3/2015 | Asmanis | |
| 2015/0335231 A1* | 11/2015 | Van Der Mark | A61B 5/02055 |
| | | | 600/301 |

OTHER PUBLICATIONS

Martin F. Schubert et al "Electroluminescence induced by Photoluminescence Excitation in GaInN/GaN Light-Emitting Diodes", Applied Physics Letters, AIP Publishing LLC, US., vol. 95, No. 19, Nov. 10, 2009, pp. 191105-1-191105-3.

Dietz, Paul et al, "Very low-cost sensing and communication using bidirectional LEDs", Mitsubishi Electric Research Laboratories (Jul. 2003).

Van Der Mark, Martin B. et al "All-optical power and data transfer in catheters using an efficient LED", Paper [9317-13], SPIE Photonics West 2015. Proc. of SPIE.

Vanttinen, K. et al "A Ga0.51In0.49P/GaAs-based Photovoltaic Converter for Two-directional Optical Power and Data Transmission", Progress in Photovoltaics: Research and Applications, vol. 3, pp. 57-63, 1995.

Vernickel, P. et al, "A Safe Transmission Line for MRI", IEEE Transactions on Biomedical Engineering, vol. 52, pp. 1094-1102, 2005—Abstract Only.

Ladd, Mark E. et al "Reduction of Resonant RF Heating in Intravascular catheters using coaxial chokes", Magnetic Resonance in Medicine, vol. 43, pp. 615-619, 2000.

Fandrey, Stephan et al "A Novel Active MR Probe using a Miniaturized Optical Link for a 1.5-T MRI Scanner", Magnetic Resonance in Medicine, vol. 67, 2012, pp. 148-155.

\* cited by examiner

OPTICAL TRANSCEIVER, OPTICAL SYSTEM, INTERVENTIONAL DEVICE AND METHOD FOR SUPPLYING ENERGY AND RETURNING DATA

CROSS-REFERENCE TO PRIOR APPLICATIONS

This application is the U.S. National Phase application under 35 U.S.C. § 371 of International Application No. PCT/EP2017/072101, filed on Sep. 4, 2017, which claims the benefit of European Patent Application No. 16186959.9, filed on Sep. 2, 2016. These applications are hereby incorporated by reference herein.

FIELD OF THE INVENTION

The present invention relates to optical transceivers, optical systems and interventional devices. An optical transceiver may be used for optically supplying energy to and returning data from a remote electronic appliance, in particular in the field of medical technology. The invention further relates to methods of optically supplying energy and optically return data.

BACKGROUND OF THE INVENTION

An optical transceiver is useful in applications, where power delivery and data transmission via electrical wires is problematic, in particular due to size restrictions of the power delivery and data transmission paths. Although the present invention is not limited to a use in medical applications, the present invention will be described herein with respect to medical applications.

In the medical field, there is a clear and ongoing trend to replace conventional surgical procedures with minimally invasive interventions. Reduced trauma, shorter hospital stay and reduced costs are the most important drivers of the adoption of minimally invasive techniques. To enable further innovation in medical instrumentation—thus enabling more advanced and more challenging minimally invasive interventions—there is a need to integrate miniature sensors for in-body imaging and physiological measurement in instruments like catheters and guidewires. The integration of sensors in the tip of such instruments implies the need for wires that can deliver power to the distal tip of the medical device and transmit data from the distal tip back to the proximal end of the medical device.

Data and power delivery to the tip of long and thin devices such as catheters or guidewires for imaging, sensing, sensitizing or even ablation can be challenging. Including, on top of that, high data rate return channel from the distal to the proximal end is even more problematic. This is due to several reasons.

Firstly, the combination of small cross-section (i.e. small diameter), necessary for the medical intervention, combined with the long length of a guidewire or catheter does severely limit the total number of electrical wires that can be integrated in such an instrument.

Secondly, the integration of multiple electrical wires compromises the flexibility of the instrument, while flexibility is a key property of this type of instruments.

Thirdly, for high data rate, such as e.g. required for an ultrasound transducer at the tip or for sensitive measurements, one often requires coaxial cables which need even more space compared to single-core wires.

Fourthly, instruments with electrical wires typically are not compatible with the use of magnetic resonance imaging due to resonances in/of the electric wiring leading to electromagnetic interference in the connected electronics and also possibly leading to tissue heating. And furthermore, thin electrical cables typically cannot support a relatively high amount of power for use at the distal end of the catheter.

Also, because of their disposable use, catheters and guidewires must be manufactured in a relatively simple and cost-effective way.

WO 2014/072891 A1 describes an optical transceiver which receives optical energy from a remote laser light source and converts the optical energy into electrical energy for powering the optical converter circuit of the transceiver. To this end, the optical transceiver comprises an optoelectronic device in form of a light emitting diode (LED). The optical converter circuit can have an electronic appliance which generates data. While this known optical transceiver is effective in providing sufficient power delivery capability to actuate an ultrasound catheter as an electronic appliance, because the optoelectronic device has a large surface area necessary to achieve the necessary power output, the large surface area of the optoelectronic device limits the bandwidth and, hence, the data rate of data transmission in the return path from the transceiver to the proximal end. For this reason, it is further proposed there to use a separate optoelectronic device, in particular a vertical cavity surface emitting laser (VCSEL) for data transmission in the return path from the distal end to the proximal end. However, a separate optoelectronic device for data transmission and a separate optoelectronic device for energy harvesting add significant complexity to both the electronic and optical part of the interventional instrument using the optical transceiver. A smaller LED used as the optoelectronic device would increase the bandwidth of data transmission, but stray capacitance and edge effects can spoil the situation, and the photovoltaic conversion efficiency of the LED is reduced.

Thus, the problem is that the optical transceiver either cannot deliver high bandwidth with a single LED only, or is less effective in photovoltaic conversion, or is complex due to the extra VCSEL and the associated cost, manufacturing and alignment problems.

Therefore, there is a need for an improved optical transceiver which retains the capability of achieving sufficient conversion power output, but increases the bandwidth of data transmission in the return path.

SUMMARY OF THE INVENTION

It is an object of the present invention to provide an optical transceiver, an optical system, an interventional device and a method of supplying energy to and returning data from a remote electronic appliance which are capable of transmitting data with high data rate, while maintaining the capability to achieve a power output sufficient for powering the electronics of the optical converter circuit, in particular for powering an electronic appliance.

In a first aspect of the present invention, an optical transceiver is provided, comprising:

an optical converter circuit comprising an optoelectronic device, an electronic appliance generating data, and circuitry configured to control the optoelectronic device and the electronic appliance, the optoelectronic device being configured to, upon receiving an incoming optical beam, convert the optical beam into electrical energy, the optoelectronic device being further configured to emit optical pulses, wherein emission of the optical pulses is induced by the incoming optical beam through photo-induced electro-luminescence, the optical pulses based on photo-induced electro-luminescence comprise the data generated by the electronic appliance, wherein the circuitry is configured to modulate the data onto the optoelectronic device according to a multiple signal-level coding scheme causing the optoelectronic device to emit the optical pulses in more than two different levels of a discrete set of optical intensities.

The optical transceiver according to the present invention is based on the concept to transmit data via optical pulses generated by the optoelectronic device based on photo-induced electro-luminescence which have multiple different levels of optical intensities. To this end, the circuitry of the optical transceiver is configured to modulate the data generated by the electronic appliance onto the optoelectronic device according to a multiple signal-level coding scheme. The number of levels of optical intensities depends on the data rate to be achieved. The higher the number of levels of optical intensities of the optical pulses is, the higher is the data rate obtained. Thus, compared to binary coding which only uses two levels of optical intensities, the data rate of the data return channel can be increased.

Further, in combination with the multiple signal-level coding scheme, the optical transceiver according to the present invention makes use of the effect of photo-induced electro-luminescence (PIEL). PIEL occurs when an optoelectronic device capable of emitting light, in particular an LED, is illuminated with light while its leads are connected to a resistance that is high enough for the device to build up a voltage higher than the band gap of the device. As a consequence, the device will start to conduct current and emit light, as it does in conventional electro-luminescence. Differently from conventional electro-luminescence, PIEL does not require an extra energy source for inducing the light emission. For, light entering the device (e.g. LED) induces a voltage in the device, the voltage induces current through the device, the current induces light emission by the device. In case of efficient LEDs, this may provide strong light emission without a current source. The output level of the luminescence intensity may be modulated by, e.g., varying the load on the LED, in order to obtain a number of different PIEL intensity levels, according to the principles of the present invention.

Use of photo-induced electro-luminescence (PIEL) in combination with a multiple signal-level modulation scheme thus has the advantage of higher data rate and nevertheless less power consumption of the optical transceiver than in case of conventional electro-luminescence.

By virtue of the present invention, a higher data rate can be obtained than when the transmitter bandwidth is only used with digital (two-level) optical pulses. The present invention thus obviates the need for additional elements such as a VCSEL and an optical beam splitter to be placed in the limited space available at the tip of an interventional device, like a catheter or a guidewire.

In the following, preferred embodiments are disclosed how the multiple signal-level coding scheme can be configured.

In an embodiment, the optoelectronic device is configure to convert the optical beam into electrical energy for powering the optical converter circuit.

By powering the optical converter circuit with electrical energy obtained from the optical beam, no further power source is needed. This is particular advantageous for applications of the invention in minimally invasive instruments, e.g. catheters, where the optical converter circuit is located near the distal end. By converting the optical beam into electrical energy for powering the circuit, including an electronic appliance like a sensor, no power source is needed in the distal end.

In an embodiment, the circuitry may be configured to vary or segment the electrical load on the optoelectronic device into a discrete set of different electric-load levels to generate the different levels of optical intensities of the optical pulses.

By changing the electrical load on the optoelectronic device, the intensity of PIEL is changed. If the electrical load on the optoelectronic device is varied or segmented according to a number of different levels of a discrete set of electrical loads, the optical pulses are generated in a number of different levels of a discrete set of optical intensities, accordingly.

Dependent on the data rate required for a specific application on the one hand, and dependent on the power needed for the electronics of the optical converter circuit on the other hand, the range of load variation or segmentation can be selected. In case that a specific application needs significant power for the electronics, e.g. the electronic appliance, but not the ultimate data rate, significant changes in the PIEL signal are not needed. A further aim namely is that the optical converter circuit has a low power consumption, i.e. low dissipation, or in other words a high efficiency. If it is desired to code multiple signal levels as efficiently as possible, it is advantageous to know the minimum variation in load that will result in an identifiable change in signal level.

Therefore, according to a further embodiment, the circuitry may be configured to vary the electrical load in a limited range around a working point of the optoelectronic device. The working point preferably is the Maximum Power Point (MPP) of photovoltaic conversion by the optoelectronic device.

The limited range around the working point can be as small as ±1%, ±3%, ±10% change of the load around the working point, dependent on the specific application.

In this way, the additional dissipation caused by the multiple signal-level coding scheme can be kept small. The minimum variation of the electrical load will also depend on the signal-to-noise ratio.

In a practical embodiment, variation of the load on the optoelectronic device may be achieved in that the circuitry comprises an electrical or electronic component with a variable resistance.

The electrical or electronic component with the variable resistance can modulate the load on the optoelectronic device in order to modulate the PIEL signal intensity. An example for an electronic component with variable resistance is a MOSFET.

The afore-mentioned embodiment is particularly advantageous when a small modulation using a discrete number of levels in a limited small range around a given working point is sufficient for the data rate needed in the return channel.

The electrical or electronic component with variable resistance can be connected to the optoelectronic device in series in a simple configuration.

If a higher data rate of data transmission is to be obtained, it can be advantageous to have the serial and the parallel load on the optoelectronic device modulated so that a larger range of levels can be obtained.

Thus, according to a further preferred embodiment, the circuitry may comprise a first and a second electrical or electronic component each with variable resistance, the first electrical or electronic component being connected to the optoelectronic device and series, the second electrical or electronic component being connected to the optoelectronic device in parallel.

The electrical or electronic component connected to the optoelectronic device in parallel can be, for example a shunt.

Electrical or electronic components for varying the electrical load on the optoelectronic device are advantageous in terms of their simplicity.

In another embodiment the circuitry may comprise a number of sub-circuitries according to the number of the levels of the multi-level coding scheme, each sub-circuitry providing an individual electrical load to the optoelectronic device.

This embodiment uses a segmentation of the load on the optoelectronic device by segmentation of the circuitry into sub-circuitries. Each of the sub-circuitries may provide a different electrical load to the optoelectronic device in order to obtain the multi-level coding scheme. An advantage is that the sub-circuitries can be configured with only digital components. The data to be transmitted may be distributed over the sub-circuitries and coded onto the optoelectronic device according to the multiple signal levels provided by the sub-circuitries.

In the afore-mentioned embodiment, each sub-circuitry or at least some of them may have an energy storing element of its own for storing electrical energy converted by the optoelectronic device from the incoming optical beam.

In this context, the optical converter circuit may provide a modulation matrix for summing signals based on several energy storing elements that may be (re)charged and uncharged independently under control of some processor such that enough power flows to the electronics at all times. The charging of the energy storing elements is controlled such that a discrete set of levels of current may flow. These currents are associated with the intensity levels of PIEL emitted from the optoelectronic device, with high currents leading to a low PIEL. The implementation does not need to use any inductors and this is an advantage if space is limited as is the case in the tip of an interventional device like a catheter or guidewire.

In a further preferred embodiment, using the principle of segmenting the circuitry into sub-circuitries, the circuitry may be configured to digitally vary the electrical load on the optoelectronic device.

This can be achieved in that the circuitry comprises a number of current sources connected to the optoelectronic device and the electronic appliance, each current source being configured to be switched on and off individually.

The advantage here is that, in comparison with variation of the load on the optoelectronic device using electrical or electronic components with variable resistance, the dissipation of the optical converter circuit when modulating the data onto the PIEL signal according to the multiple signal-level coding scheme is reduced.

The current sources can for example be created by using PNP transistors in a current mirror configuration. The load on the optoelectronic device is varied accordingly by switching on or switching off sub-sets of the current sources.

A further advantage of this embodiment is the simplicity of only using "silicon" components which can be easily integrated onto an integrated circuit, using only digital control and no analog control components.

As an alternative or in addition to the previous embodiment, it is also conceivable that the optoelectronic device may have a number of optoelectronic segments, each optoelectronic segment preferably being individually connectable to and disconnectable from the circuitry.

For example, the optoelectronic device can be a single segmented optoelectronic device, or the optoelectronic segments can be separate devices, e.g. LEDs.

In this embodiment, the optoelectronic device itself is used as a number of current sources, wherein different segments are switched to vary the load. In case of a segmented optoelectronic device, the lowest signal level may be one active segment, and the highest signal level may be the total number of active segments. A main advantage is a reduced dissipation because the optoelectronic device is "on" (powering the converter circuit) or "off". A further advantage is here that this embodiment only uses "digital silicon" components so that it can be integrated easily into an integrated circuit.

In a preferred embodiment, the optoelectronic device is a semiconductor device comprising a semiconductor material with direct band gap. In particular, the optoelectronic device is an LED, preferably a blue LED, preferably based on GaN, further preferably an InGaN-LED.

According to a second aspect of the invention, an interventional device is provided, comprising an elongated body having a length, a proximal end portion and a distal end portion, an optical guide extending along the length of the elongated body, and an optical transceiver according to the first aspect in optical communication with the optical guide, the optical transceiver being arranged in the distal end portion of the elongated body.

It should be understood that the claimed interventional device has similar and/or identical preferred embodiments as the claimed optical transceiver.

The optical guide extending along the length of the elongated body may have one or more optical fibers. The use of more than one optical fiber is possible in the present invention because no electrical wiring is required for powering and data transmission.

In a third aspect of the present invention, an optical system is provided, comprising:

a light source configured to generate an optical beam, an optical transceiver according to the first aspect arranged remote from the light source, an optical guide arranged in optical communication with the light source for guiding the optical beam from the light source to the optical transceiver in forward direction, and with the optical transceiver for guiding the optical pulses from the transceiver in return direction.

The light source preferably is a laser. While the optoelectronic device, in particular in form of an LED preferably has a high band gap, the light source preferably is a short-wavelength laser, preferably with high output power.

The optical system may further comprise a photodetector arranged to receive the optical pulses from the optical guide.

The electronic appliance may be a temperature sensor, a pressure sensor, a chemical sensor, an ultrasound transducer, a camera, a sensor for ionizing radiation, an electric field sensor, and/or an electric stimulator or a sensitizer, and/or any other electronic appliance useful in medical applications.

The optical system may further comprise a control unit which is operably connected to the light source and arranged for controlling the optical energy, wherein the control unit is further operably connected to the photodetector and arranged for receiving the data therefrom. The control unit may provide a feedback from the returning PIEL level of the optical pulses received from the optical transceiver for adjusting the optical energy of the optical beam generated by the light source. Such feedback may be advantageous to obtain a stable working point of the optical transceiver.

According to a fourth aspect of the invention, a method of supplying energy to and returning data from a remote electronic appliance is provided, comprising:

providing an optical transceiver according to the first aspect comprising the electronic appliance, supplying optical energy to the optical transceiver, converting by the optical transceiver the optical energy into electrical energy, returning optical pulses generated by the transceiver based on photo-induced electro-luminescence with more than two different levels of a discrete set of optical intensities from the optical transceiver, the optical pulses comprising data generated by the electronic appliance.

It shall be understood that the claimed method has similar and/or identical preferred embodiments as the claimed optical transceiver and the claimed optical system as disclosed above.

According to a fifth aspect of the present invention, a computer program is provided, comprising program code means for causing a computer to carry out the steps of the method according to the fourth aspect when said computer program is carried out on a computer.

BRIEF DESCRIPTION OF THE DRAWINGS

These and other aspects of the invention will be apparent from and elucidated with reference to the embodiment(s) described hereinafter. In the following drawings.

DETAILED DESCRIPTION OF THE INVENTION

Figure 1:
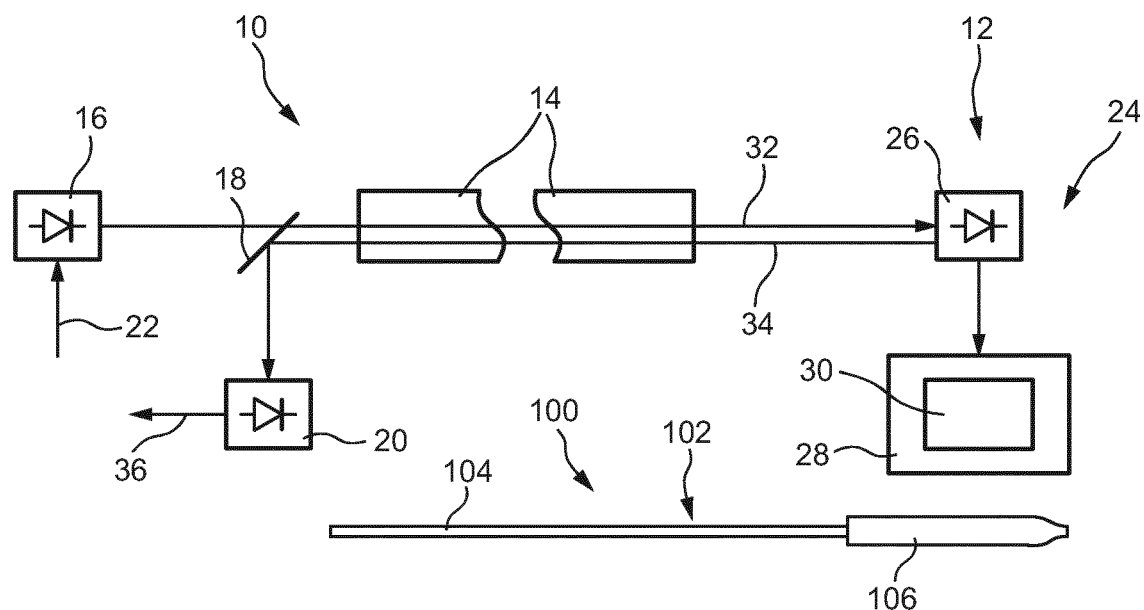
FIG. 1 schematically shows an embodiment of an optical system comprising an optical transceiver according to the present invention.

FIG. 1 shows a schematic representation of an optical system for energy and data transmission, labeled with general reference numeral 10. The optical system 10 comprises an optical transceiver 12, an elongated optical guide 14 (represented in interrupted fashion), a light source 16, a beam splitter 18 and a photodetector 20.

The optical system 10 is capable of delivering power in form of optical energy from the light source 16 via the optical guide 14 to the optical transceiver 12 and to deliver data from the optical transceiver 12 via the optical guide 14 to the photodetector 20. Further, the optical system 10 may be capable of delivering data from the light source 16 to the optical transceiver 12.

The light source 16 is capable of emitting light having an optical energy. The light source 16 may be a high band gap laser with a wavelength of, for example, 405 nm.

An arrow 22 illustrates power input as well as data input into the light source 16. The power input may be electrical power input, but also optical power input.

The light emitted by the light source 16 is launched into the optical guide 14 through the beam splitter 18. The beam splitter 18 may be a dichroic beam splitter. The optical guide 14 may comprise one or more optical fibers optically connected on the one hand to the light source 16, and on the other hand, to the optical transceiver 12. In case that the light source 16 is not only used for transmitting optical energy to the optical transceiver 12, but also to transmit data to the optical transceiver 12, such data may be modulated onto the light source 16, thus emitting light which is modulated by the data. The data transmitted by the light source 16 to the optical transceiver may be control data for controlling components of the optical transceiver 12.

The optical transceiver 12 comprises an optical converter circuit 24. The optical converter circuit 24 comprises an optoelectronic device 26, circuitry 28 and an electronic appliance 30.

In general, the optoelectronic device 26 is a semiconductor device comprising a semiconductor material with direct band gap. As an example, the optoelectronic device 26 emits light with a wavelength of about 450 nm. The optoelectronic device 26 preferably is a light emitting diode (LED), in particular an LED emitting blue light. The optoelectronic device 26 may be a blue GaN based LED, for example an InGaN-LED. For example, the LED may be an LED traded under the name "Philips Lumileds Luxeon Z, Royal Blue", with a peak emission wavelength of 446 nm.

The circuitry 28 of the optical converter circuit 24 is connected to the optoelectronic device 26 and to the electronic appliance 30 and is configured to control the optoelectronic device 26 and the electronic appliance 30. Embodiments of the circuitry 28 will be described later.

The electronic appliance 30 may be one or more of an imager, for example an ultrasonic imager, a camera, or the electronic appliance may be an ultrasound transducer, a temperature sensor, a pressure sensor, a chemical sensor, a sensor for ionizing radiation, an electric field sensor, for example for measuring an electrocardiogram, an electric stimulator or sensitizer, in order to give a few examples.

The optoelectronic device 26 is configured to receive an optical beam emitted by the light source 16 and to convert the optical energy of the optical beam into electrical energy. This electrical energy may be used for powering parts of the optical converter circuit 24, i.e. the optoelectronic device 26, the circuitry 28 and/or the electronic appliance 30. However, the optoelectronic device 26, the circuitry 28 and/or the electronic appliance 30 may receive power from another power source. The incoming optical beam as emitted by the light source 16 and received by the optoelectronic device 26 is illustrated by an arrow 32 in FIG. 1.

The optical converter circuit 24 is also configured to optically send data from the optical transceiver 12 to the photodetector 20. An arrow 34 illustrates optical pulses emitted by the optoelectronic device 26, wherein emission of these optical pulses is induced by the incoming optical beam 32 through photo-induced photo-luminescence (PIEL). The effect of PIEL will be described in more detail hereinafter.

The circuitry 28 modulates data generated by the electronic appliance 30 onto the optoelectronic device 26 so that the optical pulses 34 emitted by the optoelectronic device 26 comprise the data generated by the electronic appliance 30. The circuitry 28 modulates the data onto the optoelectronic device according to a modulation scheme which will be described later. The optical pulses emitted by the optoelectronic device are directed via the beam splitter 18 onto the photodetector 20. An arrow 36 illustrates data output from the photodetector 20 for further processing, for example image processing and representation of the data, for example image data on a display (not shown). In case the electronic appliance 30 is, for example, an imager, the data output 36 are images (live images or still images) which can be made visible on a display.

As an example, the incoming light beam 32 may have a wavelength of about 405 nm, and the optical pulses 34 have a wavelength of about 450 nm.

The band gap of the optoelectronic device 26 preferably is similar to, or even preferably, slightly lower than the wavelength of the incoming optical beam 32. The incoming optical beam 32 is converted by the optoelectronic device 26 into electrical energy. Thus, one function of the transceiver 12 is to harvest energy from an incoming optical beam by photovoltaic conversion.

The incoming beam 32 produces a current in the circuitry 28 attached to the optoelectronic device 26. The circuitry 28 is designed to influence the electrical impedance felt by the optoelectronic device 26. For example, the circuitry 28 can essentially disconnect the optoelectronic device 26 by raising the impedance substantially, thereby also disconnecting its own power source. The circuitry 28 may comprise a capacitor, as will be described later, which is used to bridge the time period without external supply of power from the optoelectronic device 26. By disconnecting the optoelectronic device 26, PIEL will occur in the optoelectronic device 26. This luminescence light has a longer wavelength than the adsorbed light from the incoming optical beam 32 and is transported to the photodetector 20. By this means, the optical transceiver 12 can send data to the photodetector 20. Thus, one further function of the transceiver 12 is to optically transmit data.

The input power from the light source 16 can be changed to adjust to find the optimum working point for power efficiency (the so-called Maximum Power Point, as will be described later). A feedback loop can be made in which the total luminescence (the sum of photo-luminescence and photo-induced electroluminescence is monitored to measure the load on the optoelectronic device 26, and from that to deduce the working point and power efficiency of the electronics of the optical transceiver 12.

Next, optical to electrical power (photovoltaic) conversion and PIEL will be explained in more detail with reference to FIGS. 8 to 10.

As an example, a blue LED traded under the name "Philips Lumileds Luxeon Z, Royal Blue" with a peak emission wavelength of 446 nm was examined as the optoelectronic device 26. In normal forward operation, this LED runs on 1 mA at 3 V with efficiency up to 43%. Its area is just 1 mm$^2$, thus providing a forward power density of ~1000 mW/cm$^2$.

In a measurement, this LED was illuminated with light from a laser light source with a wavelength of 405 nm for transferring optical energy to the LED. Thus, the laser can also be denoted as pump laser light source.

The LED was illuminated at three different laser light source output powers. FIG. 8 shows the measured current (I)-voltage (U) curves of the LED, wherein curve 38 is an I-U curve at a laser output power $P_{laser}$=6.2 mW, curve 40 is an I-U curve at a laser output power $P_{laser}$=38.0 mW, and curve 42 is an I-U curve at a laser output power $P_{laser}$=52.1 mW. To measure the curves 38, 40 and 42, variable resistances were connected to the leads of the LED so that the load (the conductance) could be varied. It can be seen that the curves 38, 40, 42 are quite square and have a high fill factor. This means that the voltage drop upon increasing the load is quite limited up until the point where more power is demanded than what is converted by the LED. For the curve 42 with the highest laser pump power ($P_{laser}$ 52.1 mW), the photovoltaic power generated at the Maximum Power Point (MPP) is $P_{out,MPP}$=2.23 V×9.8 mA=21.9 mW. The MPP is where the most optimum conversion efficiency is obtained, in this case: η=21.9/52.1=42%.

The curve 42 further reveals a short circuit current $I_{SC}$ of 10 mA at $P_{laser}$=52.1 mW, and the curves 38, 40 and 42 reveal an open circuit voltage $U_{OP}$=2.6 V.

An LED exhibits three types of luminescence. The first type of luminescence corresponds to the normal use of an LED as a light source. In this case, the energy from an input current is converted to produce light. This effect is called electro-luminescence (EL). A second type of luminescence is photo-luminescence (PL). In this case, light emission occurs when light of higher energy than the band gap of the LED is illuminating the LED. The wavelength of PL is the same as the wavelength of EL. Since for PL the pump light must have a higher energy than the band gap of the LED, this is the same situation that also produces a photovoltaic current, and PL may be seen as a "parasitic" effect in photovoltaic conversion (PV). The emission of PL is not very strong compared to EL at the same input power.

Figure 8:
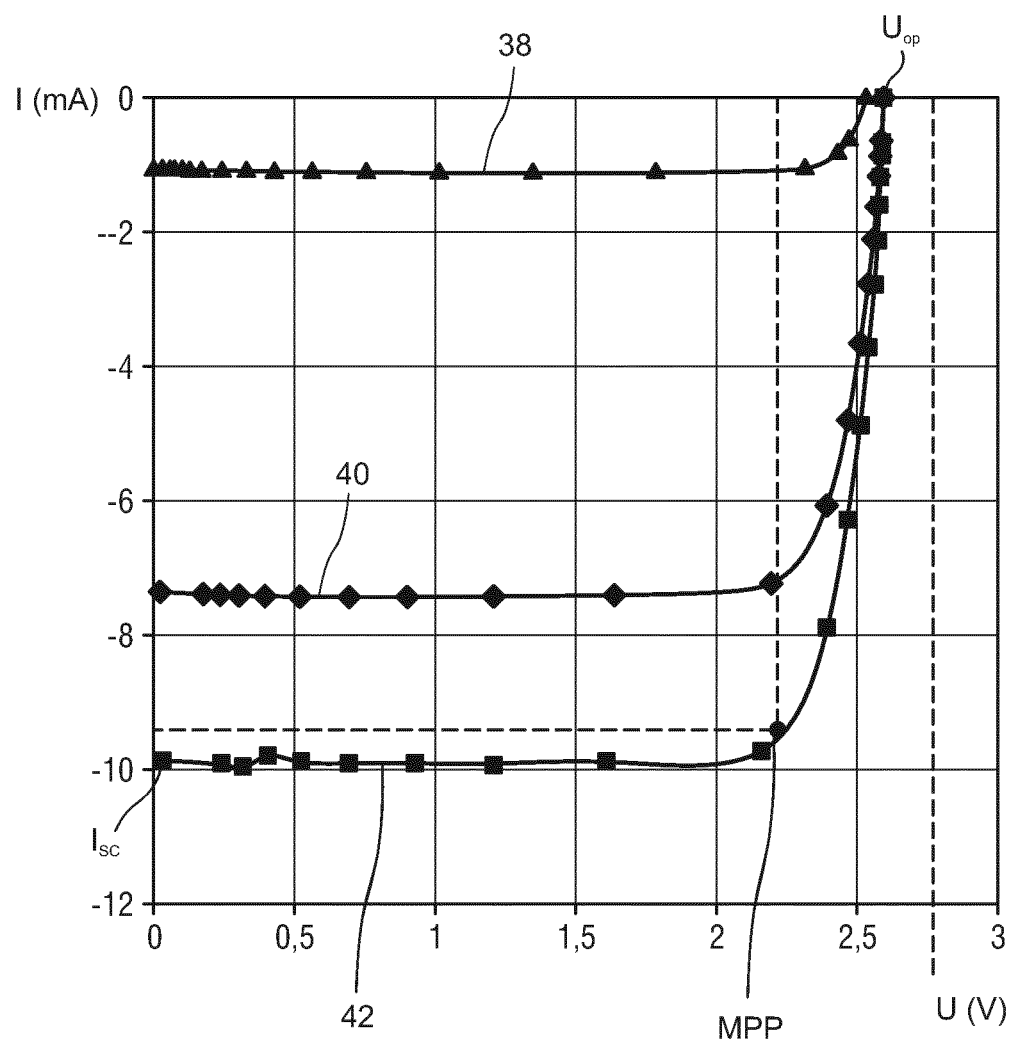
FIG. 8 shows a graph of current-voltage curves for an LED at different pump light powers.
Figure 9:
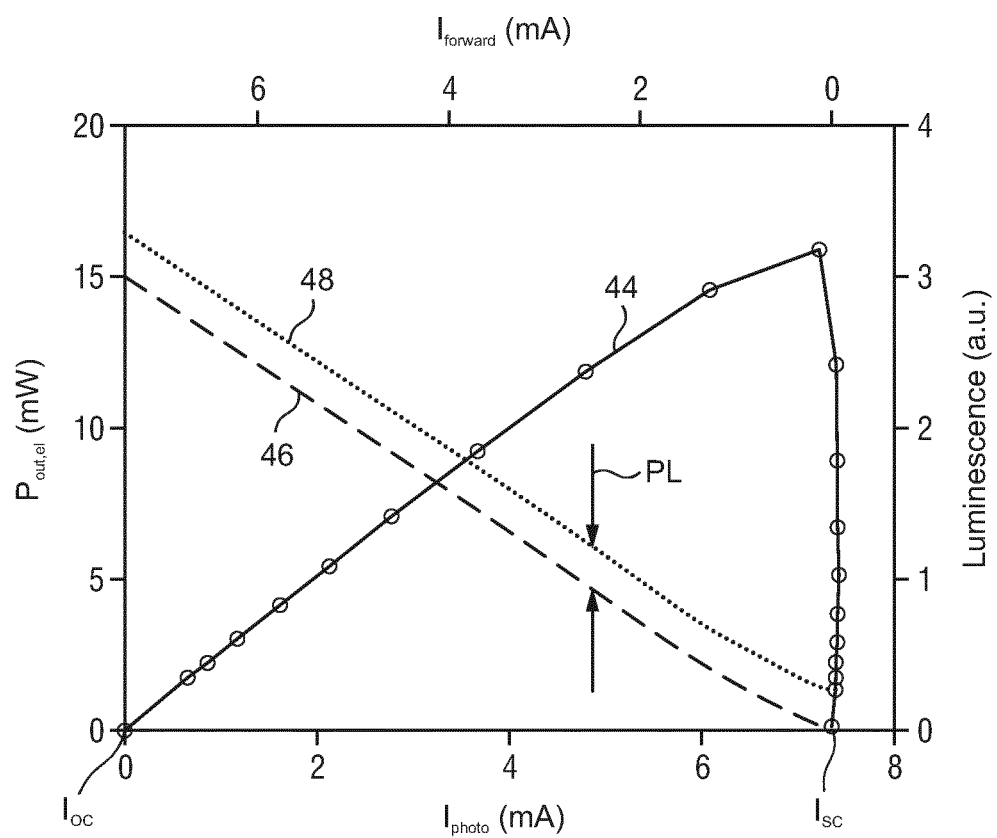
FIG. 9 shows a graph of output power from the LED for photovoltaic conversion, electro-luminescence and photo-induced electro-luminescence plus photo-luminescence.

FIG. 9 shows a graph from measurements carried out on the same type of LED as in case of the measurement according to FIG. 8, wherein the left vertical axis shows the measured (photovoltaic) electrical output power $P_{out,el}$ of bottom the LED, the boom horizontal axis shows the photocurrent $I_{photo}$ of the LED, the top horizontal axis shows the forward LED current $I_{forward}$, and the right vertical axis shows the luminescence of the LED. The measurements have been carried out at a laser output power $P_{laser}$=38 mW.

A curve 44 shows the electrical output power $P_{out,el}$ as a function of the photocurrent $I_{photo}$. Joe denotes the open circuit current, and $I_{sc}$ denotes the short circuit current.

A curve 46 shows the electro-luminescence (EL) (luminescence is taken on the right vertical axis) in dependence on the forward LED current $I_{forward}$ (top horizontal axis).

There is a third type of luminescence, called photo-induced electro-luminescence (PIEL). PIEL occurs when an LED is illuminated while its leads are connected to a resistance that is high enough for the LED to build up a voltage higher than the band gap. If the voltage built up is higher than the band gap, the LED will start to conduct and emit light, as it does in EL. Thus, in PIEL, light induces a voltage in the LED, the voltage, if above a certain level, induces a current in the LED, and the current produces light emission from the LED. In the case of efficient LEDs this provides strong emission without an extra current source, and variation of the load on the LED will modulate the PIEL light output intensity level. Thus, PIEL does not consume extra energy stored in the transceiver 12 from the photovoltaic conversion, because it takes its energy from the incoming optical beam from the pump light source. The efficiency $\eta_{PIEL}$ of PIEL is the product of the photovoltaic power conversion efficiency $\eta_{PV}$ and electro-luminescence efficiency $\eta_{EL}$.

In FIG. 9, a curve 48 shows the PIEL plus the "parasitic" PL for a laser output power $P_{laser}$=38 mW. The difference between the curve 48 and 46 at the short circuit current $I_{SC}$ is the level of PL which indeed is small. The level of PL is constant. The slopes of PIEL+PL (curve 48) and EL (curve 46) are similar, because $\eta_{PV} \sim \eta_{EL}$. The right axis of the graph in FIG. 9 (luminescence) was scaled in such a way that it almost corresponds with the output power on the left vertical axis.

Maximum emission of PIEL is obtained at open circuit of the LED, where it amounts to: $\eta_{PIEL}=\eta_{EL} \eta_{PV} \sim 18\%$ in case of $\eta_{PV} \sim 42\%$ and $\eta_{EL} \sim 43\%$.

Since $\eta_{PV} \sim \eta_{EL}$, the total output power from the LED is almost constant, divided up between light and electricity, depending on the applied load on the LED.

Figure 10:
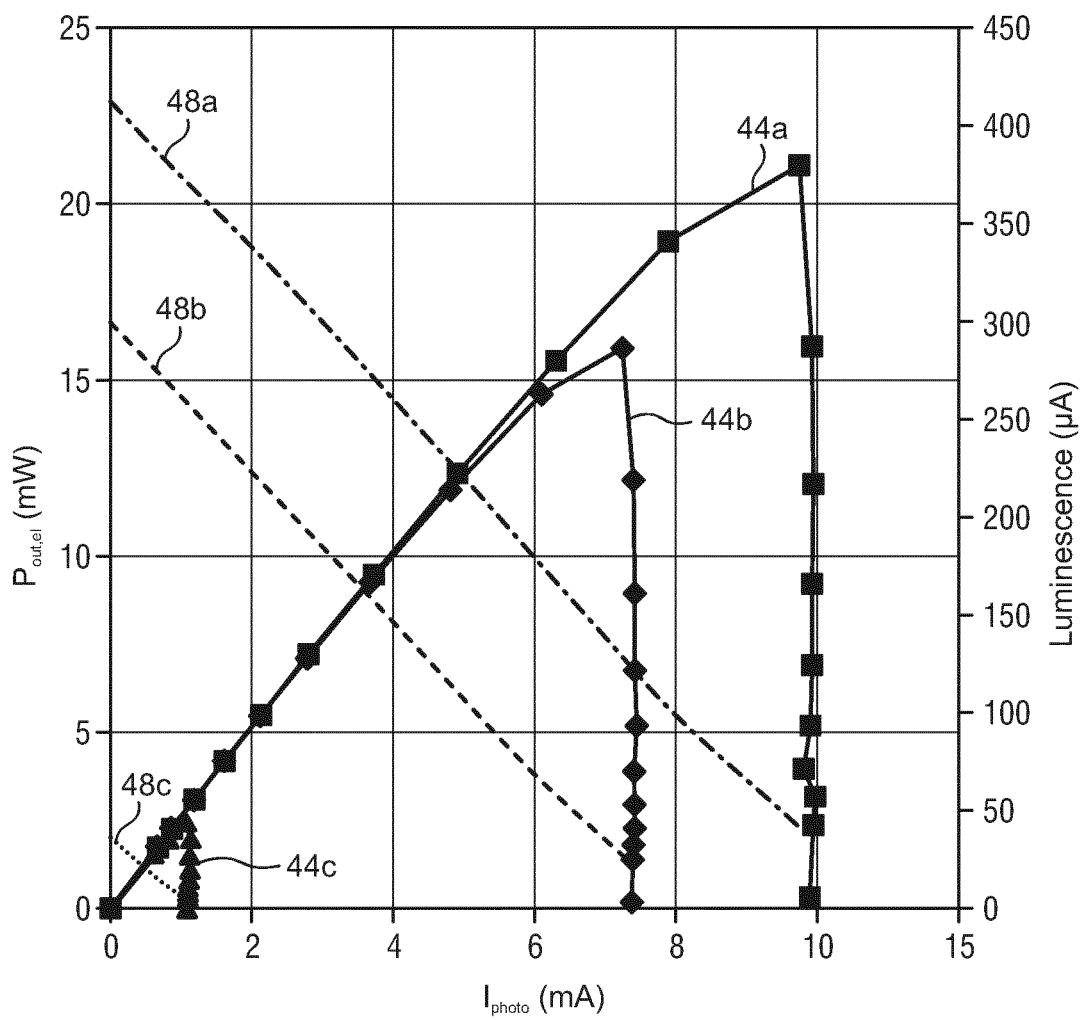
FIG. 10 shows a graph of output power curves for the LED for photovoltaic conversion and photo-induced electro-luminescence plus photo-luminescence at different pump light powers.

FIG. 10 shows a graph similar to the graph in FIG. 9, wherein the graph in FIG. 10 shows the measurements on the LED as in FIG. 9 at three different laser output powers of the laser pumping the LED. The curves 44a, 44b, 44c show the photovoltaic output power $P_{out,el}$ (left vertical axis) of the LED in dependence on the current $I_{photo}$ through the LED, and the curves 48a, 48b, 48c show the luminescence (PIEL+PL, EL is not shown) of the LED on the photodetector, wherein the curves with the additional letter "a" are taken at a pump laser output power $P_{laser}$=6.2 mW, the curves with the additional letter "b" are taken at a pump laser output power $P_{laser}$=38.0 mW (see FIG. 9), and the curves with the additional letter "c" are taken at a pump laser output power $P_{laser}$=52.1 mW.

The present invention uses for data transmission from the transceiver 12, on the one hand, the effect of PIEL, and on the other hand, a multiple signal-level coding scheme causing the optoelectronic device 26 to emit optical pulses in more than two different levels of a discrete set of optical intensities for sending data from the transceiver 12 to the photodetector 20, thus achieving a high band rate. The optical pulses may be emitted in, for example, 4, 8, 16 intensity levels. Thus, the circuitry 28 is configured to modulate the data onto the optoelectronic device 26 according to a multiple signal-level coding scheme as will be described hereinafter.

Figure 2:
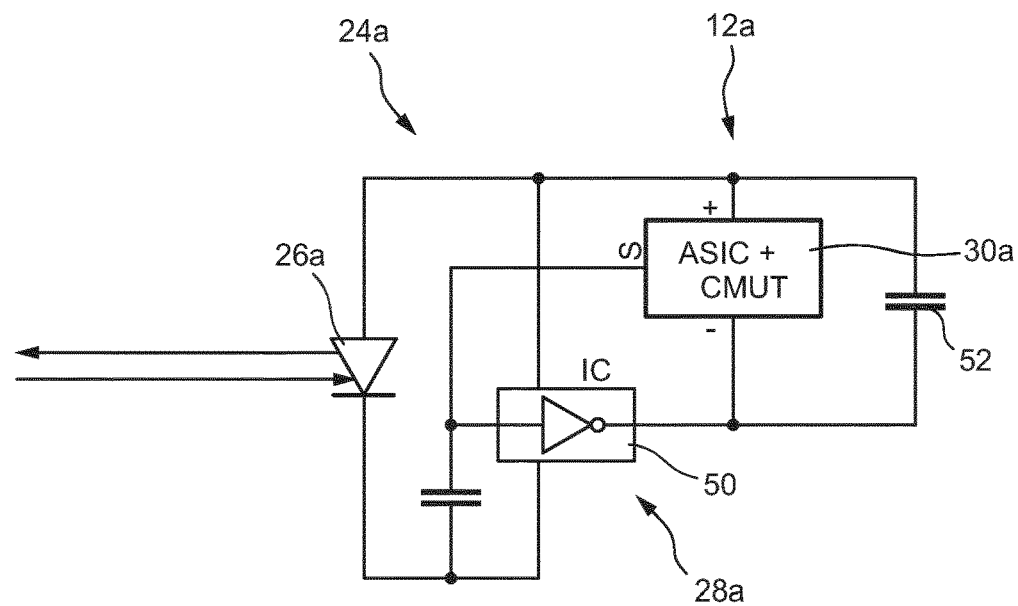
FIG. 2 shows a circuit diagram of an optical transceiver according to a first embodiment.

Before coming to the multi-level coding scheme, first an embodiment of a single binary modulation of data onto the optoelectronic device 26 is given with reference to FIG. 2. As far as FIG. 2 shows elements identical with or similar to the elements in FIG. 1, the same reference numerals are used as in FIG. 1 with an added "a".

FIG. 2 shows an optical transceiver 12a comprising an optical converter circuit 24a having an optoelectronic device 26a, circuitry 28a, and an electronic appliance 30a.

The electronic appliance 30a may be a CMUT pressure sensor comprising an ASIC. The CMUT pressure sensor may produce a pressure-dependent frequency-modulated output signal, which in turn is used to modulate the PIEL signal from the optoelectronic device 26a. The ASIC is provided with positive and negative voltage supply from the optoelectronic device 26a, and the ASIC's pressure-dependent output signal is utilized to control an inverter 50 with open collector (for example, type 74AUP2G06). As a result, the inverter 50 modulates the load on the optoelectronic device 26a by pinching off the current from the optoelectronic device 26a and at the same time the ASIC draws its own power from a capacitor 52 on which electrical energy generated by the optoelectronic device 26a through conversion of optical energy into electrical energy is stored.

In accordance with the concept of the present invention, modulation of the load on the optoelectronic device 26, in particular an LED, results in intensity modulation of the PIEL which is transmitted via the optical guide 14 in the return path, which is also used for "pumping" the optoelectronic device 26 with the light emitted by the light source 16.

As a general remark, the transceivers according to the present invention are configured to be simple, compact and to have low energy dissipation, i.e. high efficiency. As comes out from the discussion of FIGS. 8 to 10 above, the effect of PIEL is only significant if the change of load on the optoelectronic device is also significant. Hence, ideally, all power dissipated for this purpose should go in powering the electronics of the optical converter circuit 24 behind the LED. In other words, the more power is dissipated in the electronics of the optical converter circuit 24, the more laser power is needed for pumping the LED, and the more powerful the PIEL signal will be. A powerful PIEL signal allows for more signal levels, and hence a higher bandwidth and, thus data rate of data transmission from the transceiver 12 in the return path, i.e. to the photodetector 20.

In general, in data communications where data are sent over a channel, the data rate depends on the available bandwidth, the level of the signals used and the quality of the channel (the level of noise).

The bit rate of a system increases with an increase of the number of signal levels L used to denote a symbol. A symbol can consist of a single bit (n=1, binary coding) or "n" bits. The number of signal levels is $L=2^n$. As the number of levels L goes up, the spacing between levels decreases thereby increasing the probability of an error occurring in the presence of transmission impairments. Nyquist's theory gives the upper bound for the bit rate of the transmission system by calculating the bit rate directly from the number of bits in a symbol (or signal levels) and the bandwidth B of the system (assuming 2 symbols/per cycle and first harmonic). Nyquist's theorem states that for a noiseless channel, the capacity $C_{noiseless}=2 B^2 \log L=2 B^2 \log 2^n$, wherein B is the bandwidth in Hz, and n the number of bits per symbol.

Shannon's theorem gives a capacity $C_{max}=B^2 \log (1+SNR)$, wherein SNR is the signal-to-noise ratio.

For a given system, in order to find the appropriate bit rate and number of signal levels, first the Shannon formula is used to find $C_{max}$, the upper limit for the bit rate, second a practical value of the bit rate C is chosen which may be somewhat lower than $C_{max}$, and third, the Nyquist formula is used to find, L, the number of signal levels, wherein $L_{max}=(1+SNR)^{1/2}$.

Given a specific application that may need significant power for the electronics (circuitry 28 and electronic appliance 30), but not the ultimate data rate, significant changes in the PIEL signal are not needed. Thus, for the sake of low power consumption of the optical converter circuit, it is an aim to code multiple signal levels on the optoelectronic device 26 for data transmission as efficiently as possible. Therefore, it is useful to know the minimum variation load that will result in an identifiable change in signal level for enabling a multiple signal-level coding scheme providing more than two signal-levels so that the optoelectronic device 26 can emit optical pulses in more than two different levels of a discrete set of optical intensities.

In order to provide the multiple signal-level coding scheme with a dissipation as low as possible, it is beneficial to introduce a minimum variation in the signal levels as needed for the data rate to be transmitted. For example, for a 1 MHz binary bandwidth, a minimum change of 2% of the load on the optoelectronic device 26 is needed, so that the load can be modulated between +1% and −1% load. If 2 Mbps data rate is required, a modulation of the load on the optoelectronic device 26 between +3% and −3% is appropriate, and further, for example, if a data rate of 4 Mbps is needed, the load on the optoelectronic device 26 may be modulated between +7% and −7%. That way, the additional dissipation caused by the modulation of the load for modulating the data on the optoelectronic device 26 is still small, while this also depends on the SNR that can be expected. The afore-mentioned scheme may be part of a dynamically adaptable mechanism for the channel data capacity.

Following from the foregoing, the circuitry 28 preferably is configured to vary or segment the electrical load on the optoelectronic device 26 according to a discrete set of different electrical-load levels to generate the different levels of optical intensities of the optical pulses which are generated based on PIEL. Further, as explained before, the circuitry 28 is preferably configured to vary the electrical load in a limited range around a working point of the optoelectronic device 26, wherein the working point may be the Maximum Power Point (MPP) described above.

In order to obtain a stable working point, feedback of pump laser output power (light source 16) may be obtained from the returning luminescence level of the optoelectronic device 26 as detected by the photodetector 20.

Figure 3:
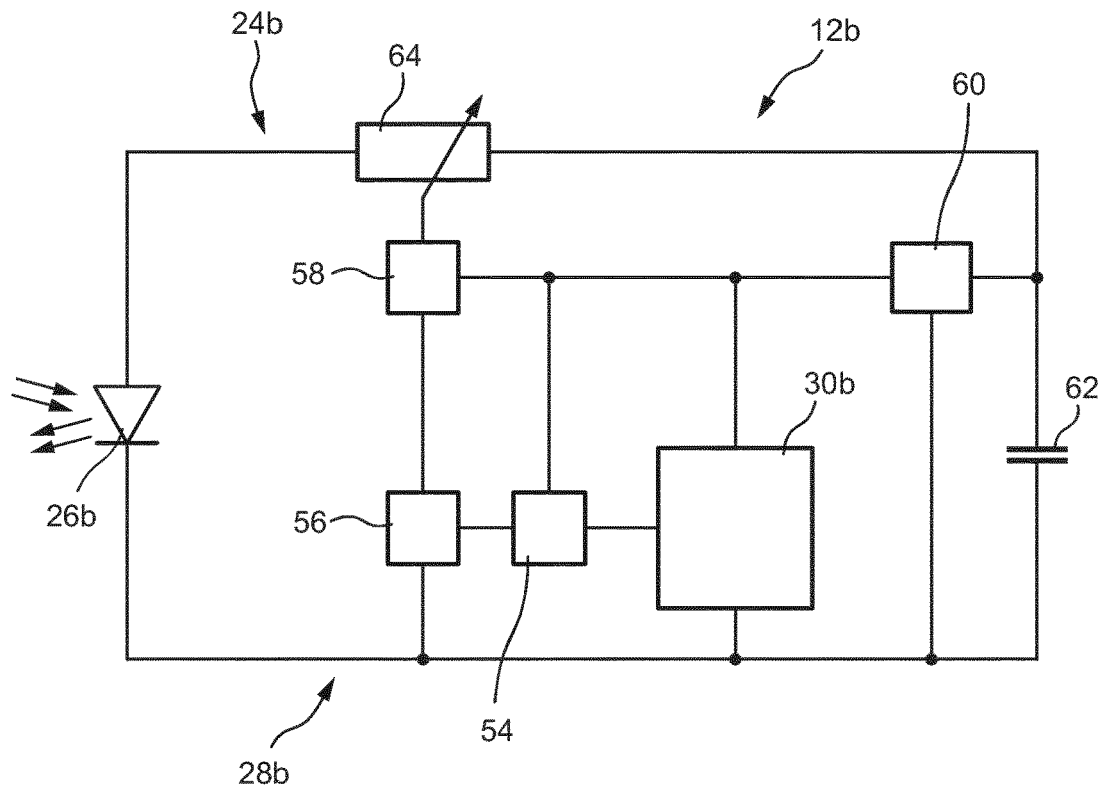
FIG. 3 shows a circuit diagram of an optical transceiver according to a further embodiment.

In FIG. 3, an embodiment of a transceiver 12b is shown, comprising an optical converter circuit 24b, the optical converter circuit 24b comprising an optoelectronic device 26b, in particular an LED, circuitry 28b and an electronic appliance 30b. The electronic appliance 30b is, for example, an imager (optical or ultrasonic, for example). The circuitry 28b comprises an analog-to-digital (A/D) converter 54, a microcontroller 56, a digital-to-analog (D/A) converter 58, a low drop-out voltage regulator (LDO) 60, a capacitor 62. The circuitry 28b further comprises an electric or electronic component 64 with variable resistance for varying the electrical load on the optoelectronic device 26b. The electric or electronic component 64 may be a MOSFET, for example.

A/D conversion of the signals generated by the electronic appliance 30b through A/D converter 54 is followed by a D/A conversion through D/A converter 58 into a desired number of signal levels. By modulating the load on the optoelectronic device 26b via the electric or electronic component 64, the PIEL emission of the optoelectronic device 26b can be modulated into a plurality of intensity levels, since the intensity of PIEL depends on the current through the optoelectronic device 26b. The capacitor 62 is charged by the optoelectronic device 26b which converts incoming optical energy into electrical energy. By varying the load through component 64, the voltage at the capacitor 62 may show voltage swings, but the low drop-out voltage regulator 60 ensures that the charge is used efficiently to power the electronic appliance 30b and other electronics of the optical converter circuit 24b. The embodiment according to FIG. 3 is especially advantageous when a small modulation of the load on the optoelectronic device 26b using a discrete number of levels around a given working point of the optical converter circuit 24b is sufficient for the data rate needed in the return channel from the optoelectronic device 26b to the photodetector 20. In the embodiment of FIG. 3, the component 64 with variable resistance is connected to the optoelectronic device 26b in series.

Figure 4:
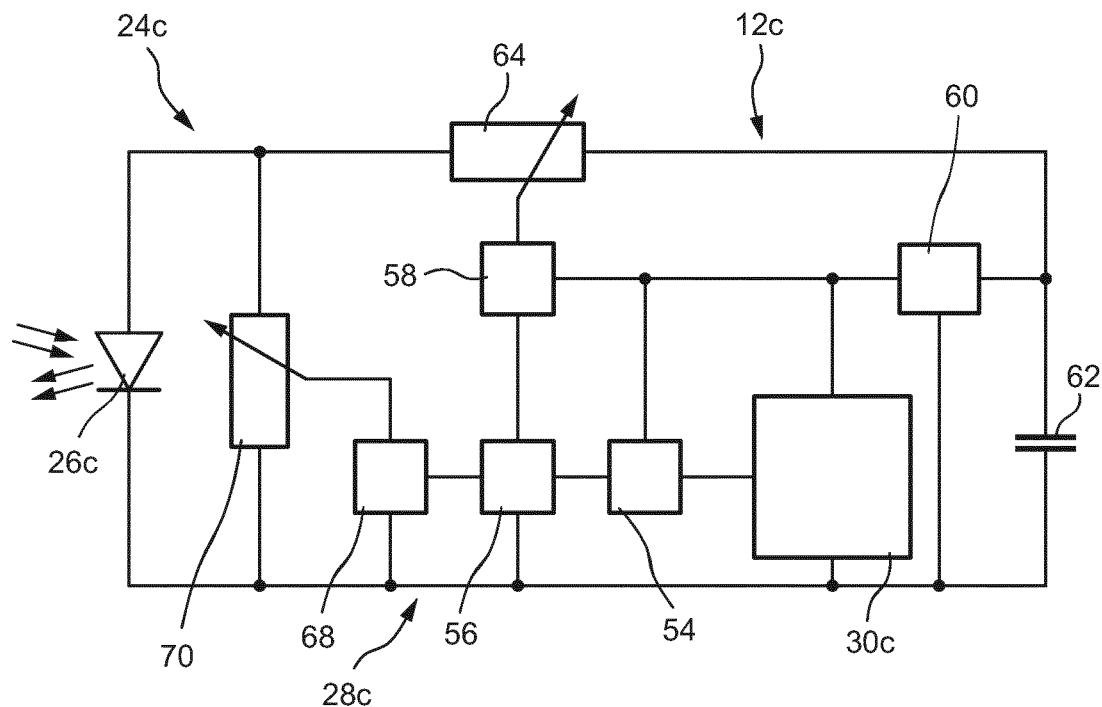
FIG. 4 shows a circuit diagram of an optical transceiver according to a still further embodiment.

If a higher data rate in the return path is needed, it can be beneficial to vary not only the serial load on the optoelectronic device 26b as in FIG. 3, but also to vary the parallel load to obtain a larger range of signal levels. An embodiment revealing this aspect is shown in FIG. 4. FIG. 4 shows an optical transceiver 12c with an optical converter circuit 24c having an optoelectronic device 26c, circuitry 28c and an electronic appliance 30c and the components 54, 56, 58, 60, 62, 64 as described with reference to FIG. 3. In addition, the circuitry 28c comprises an electric or electrical component 70 and a further digital-to-analog (D/A) converter 68. The component 70 with variable resistance may be a shunt connected to the optoelectronic device 26c in parallel. The additional shunt load is used to be able to modulate the optoelectronic device 26c over the full range, i.e. to short circuit same.

Figure 5:
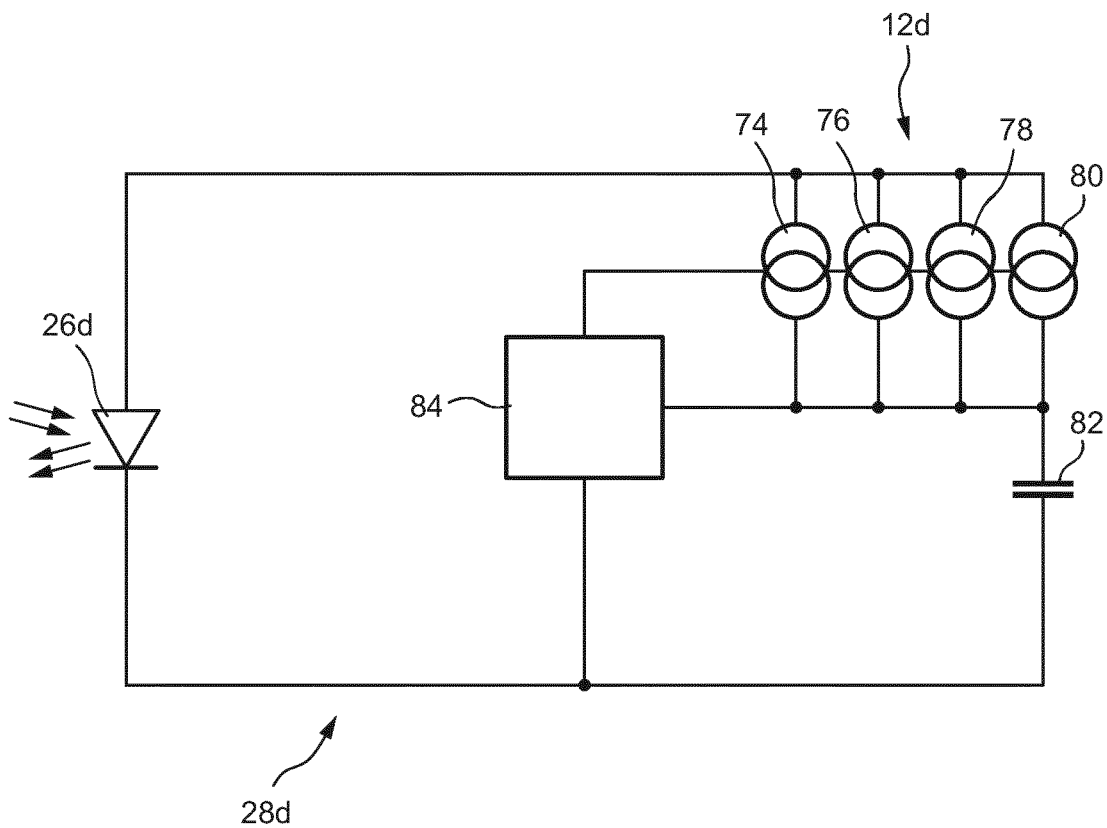
FIG. 5 shows a circuit diagram of an optical transceiver according to a still further embodiment.

While the embodiments according to FIGS. 3 and 4 use electric or electrical components with variable resistances in order to vary the load on the optoelectronic device 26, FIG. 5 shows another embodiment of an optical transceiver 12d which is capable to digitally vary the load current on the optoelectronic device 26d by using a number of current sources 74, 76, 78, and 80 which charge the capacitor 82. The current sources 74, 76, 78, 80 are controlled by a microcontroller 84. In order to vary the load current on the optoelectronic device 26d, the current sources 74, 76, 78, 80 are individually switched on or switched off, wherein the current load on the optoelectronic device 26d is varied depending on the number of the current sources 74, 76, 78, 80 being switched on or being switched off. While four current sources are shown in FIG. 5, a lower or higher number of current sources can be provided. The current sources 74, 76, 78, 80 can, for example, be created by using PNP transistors in a current mirror configuration. The only constraint may be that the average current to the capacitor 82 over a longer period is equal to the average current from the capacitor 82. In general, the principle behind the embodiment in FIG. 5 is that the circuitry 28d comprises a number of sub-circuitries illustrated by the different current sources 74, 76, 78, 80, wherein each of the sub-circuitries provides an individual electrical load to the optoelectronic device 26d so that the load on the optoelectronic device is segmented into a number of load levels.

It is to be noted that for the sake of simplicity, the electronic appliance and the LDO have been omitted in FIG. 5, but it is to be understood that such a functional circuit is also present in the embodiment in FIG. 5.

Figure 6:
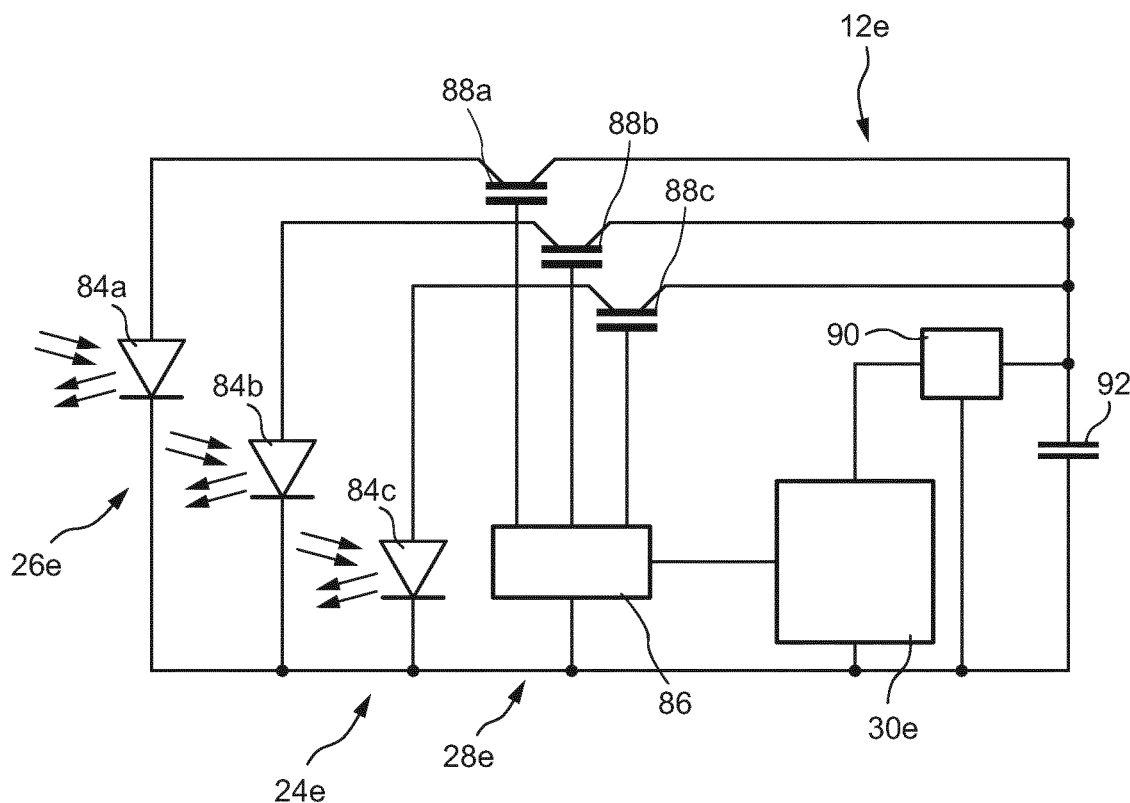
FIG. 6 shows a circuit diagram of an optical transceiver according to a still further embodiment.

An embodiment which is based on a similar principle as the embodiment in FIG. 5 is shown in FIG. 6. FIG. 6 shows an optical transceiver 12e comprising an optical converter circuit 24e comprising an optoelectronic device 26e, circuitry 28e and an electronic appliance 30e. In this embodiment, the optoelectronic device 26e itself is used as the (ideal) current source. To this end, the optoelectronic device 26e has a number of optoelectronic segments 84a, 84b, and 84c. Each of the optoelectronic segments 84a, 84b and 84c is configured to receive an incoming optical beam and to convert the optical energy into electrical energy, and to emit optical pulses comprising data generated by the electronic appliance 30e. The optoelectronic segments 84a, 84b, and 84c may be segments of a segmented single optoelectronic device, in particular segments of a segmented LED, or may be individual optoelectronic devices, for example a number of single LEDs.

The segments 84a, 84b, 84c are switched individually, or in other words, are individually connectable and disconnectable from the circuitry 28e, in order to segment the load and, thus, to obtain a multiple signal-level coding scheme for generating optical pulses in more than two different levels of a discrete set of optical intensities.

The circuitry 28e comprises a microcontroller 86 connected to the segments 84a, 84b, 84c via, for example, transistors 88a, 88b, 88c, and the microcontroller 86 is connected to the electronic appliance 30e. The circuitry 28e further comprises an LDO and a capacitor 92, wherein the capacitor 92 is charged with electrical energy generated by the segments 84a, 84b, 84c from incoming optical energy from the light source 16 in FIG. 1, for example.

In the embodiment of FIG. 6, the segments 84a, 84b, 84c are individually switched "on" and "out" in order to vary the load and thus, to obtain the multiple signal-level coding scheme. The lowest signal level may be one active segment 84a, or 84b, or 84c, up to the total number of active segments 84a, and 84b, and 84c. This embodiment provides reduced dissipation, because the optoelectronic segments 84a, 84b, 84c are segments of an LED or are single LEDs, and an LED is "on", thus powering the optical converter circuit 24e, or "off".

Multi-level coding by using segmented LEDs is based on encoding multiple bits into a signal using different brightness levels—i.e. light intensities—from different segment sizes of the LED being active. In case of the optoelectronic segments being n segments of a segmented LED, the segments could have areas of ratio $1:2:4:8: \ldots :2^{(n-1)}$ representing $2^n$ light intensity levels of the emitted optical pulses. In the embodiment of FIG. 6 having three segments 84a, 84b, 84c, the areas of two segments can be combined to form a 1:2 ratio with the third segment, whereby four levels can be obtained.

Figure 7:
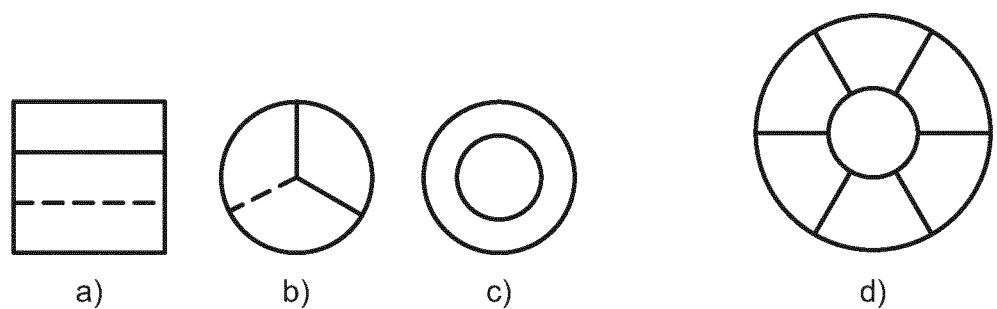
FIGS. 7a) to 7d) show embodiments of a segmentation of an optoelectronic device.

FIG. 7a) to d) show some examples of how an optoelectronic device, for example an LED, could be segmented to emit optical pulses in a number of $2^n$ light intensity levels. Two areas of ratio 1:2 represent two bits per symbol and four light levels. FIGS. 7a) to 7c) show three examples of such a segmentation, wherein FIG. 7a) and FIG. 7b) show three equal areas of segments, of which two have been merged (indicated by a dotted line). FIG. 7d) shows a segmentation into seven equal areas which allows for merging into three areas of ratio 1:2:4 representing eight light intensity levels.

For example, in the case of sending 3 bits simultaneously (000, 001, 010, . . . , 111, corresponding to the numbers 0 to 7), j/7*100% of the LED would be needed being active, with j=0, 1, 2, . . . , 7. These can be most easily encoded by having three segments with area ratios of 1:2:4. The 3-bit pattern 000, 001, 010, 011, 100, 101, 110, 111 determines which of the 1-segment, 2-segment or 4-segment is on or off. In the present example, for sending a 000, all segments are off, for sending a 001, the 1-segment is on and the 2-segment and 4-segment are off, for sending a 010, the 1-segment is off, the 2-segment is on and the 4-segment is off, and so on, and for sending a 111, all segments are on.

The benefit of this approach is that it can be realized by simply mapping the bits in order of significance on segment sizes. For 4-bit patterns the ratios would be 1:2:4:8, for 5-bit patterns the ratios would be 1:2:4:8:16 and so on. For each bit only a single switch is needed. The operation is at maximum efficiency for the multi-level coding because a segment is always completely on or completely off, thus minimizing power loss.

The embodiments of the transceivers on FIGS. 3 to 6 may be implemented in the optical system in FIG. 1 as the transceiver 12.

In the embodiments according to FIGS. 3 to 6, the optical converter circuits 24b to 24e each comprise only one capacitor 62, 82, 92 for storing electrical energy generated by the optoelectronic device 26b, 26c, 26d or 26e, respectively. However, it is also possible to provide a modulation matrix for summing signals based on several energy storing capacitors that may be charged and uncharged independently of one another under control of some processor such that enough power flows to the electronics of the optical converter circuits at all times. The charging of the capacitors may be controlled such that a discrete set of levels of current may flow. These currents are associated with the intensity levels of PIEL emitted from the optoelectronic device, with high currents leading to low PIEL. In other words, the power supply and electronics may be segmented in as many parts L, e.g. with equal load, as there are signal levels, and each of the parts may have its own capacitor to bridge the gap when power is shut off to send a symbol. As an example, electronics for imaging may have N amplifiers to provide a natural segmentation of load into L=N/n levels, with n, L and N all integer.

With reference to FIG. 1 again, the optical transceiver 12 and at least a part of the optical guide 14 may be integrated into an interventional device 100. The interventional device 100 may be a catheter, guidewire or endoscope. Accordingly, the interventional device 100 has an elongated body 102 having a proximal end portion 104 and a distal end portion 106. The proximal end portion 104 may be configured to be connected to an optical console (not shown) which in turn may comprise the light source 16 and the photodetector 20. The beam splitter 18 may be an interface device between the console and the interventional device 104. The optical transceiver 12 may be integrated into the distal end portion 106 of the interventional device 100.

According to the disclosure above, a method of supplying energy to and returning data from a remote electronic appliance 30 comprises: Providing an optical transceiver 12 according to one of the embodiments described above, which comprises the electronic appliance 30, supplying optical energy to the optical transceiver 12, converting by the optical transceiver 12 the optical energy into electrical energy for powering the electronic appliance 30, and returning optical pulses generated by the transceiver 12 based on photo induced electro-luminescence with more than two different levels of a discrete set of optical intensities from the optical transceiver 12, the optical pulses comprising data generated by the electronic appliance 30. The circuitry 28 of the optical converter circuit 24 of the transceiver 12 modulates the data onto the PIEL signal emitted by the optoelectronic device 26 according to a multiple signal-level coding scheme by varying or segmenting the load on the optoelectronic device 26 into multiple load levels in order to obtain the optical pulses based on PIEL with the more than two intensity levels.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An apparatus, comprising:
   an optical converter circuit comprising an optoelectronic device;
   an electronic appliance generating data; and
   circuitry configured to control the optoelectronic device and the electronic appliance,
   the optoelectronic device being configured to, upon receiving an incoming optical beam, convert the optical beam into electrical energy,
   the optoelectronic device being further configured to emit optical pulses, wherein emission of the optical pulses is induced by the incoming optical beam through photo-induced electro-luminescence (PIEL), the optical pulses based on photo-induced electro-luminescence comprise the data generated by the electronic appliance,
   wherein the circuitry is configured to modulate the data onto the optoelectronic device according to a multiple signal-level coding scheme causing the optoelectronic device to emit the optical pulses in more than two different levels of a discrete set of optical intensities, and
   wherein the circuitry is configured to vary or segment an electrical load on the optoelectronic device into a discrete set of different electrical-load levels to generate the different levels of optical intensities of the optical pulses.

2. The apparatus of claim 1, wherein the optoelectronic device is configured to convert the optical beam into electrical energy for powering the optical converter circuit.

3. The apparatus of claim 1, wherein the circuitry is configured to vary the electrical load in a limited range around a working point of the optoelectronic device.

4. The apparatus of claim 1, wherein the circuitry comprises an electrical or electronic component with variable resistance.

5. The apparatus of claim 4, wherein the electrical or electronic component with variable resistance is connected to the optoelectronic device in series.

6. The apparatus of claim 1, wherein the circuitry comprises a first and a second electrical or electronic component each with variable resistance, the first electrical or electronic component being connected to the optoelectronic device in series, and the second electrical or electronic component being connected to the optoelectronic device in parallel.

7. The apparatus of claim 1, wherein the optoelectronic device has a number of optoelectronic segments.

8. The apparatus of claim 1, wherein the optoelectronic device is a semiconductor device comprising a semiconductor material with direct band gap.

9. The apparatus of claim 1, further comprising:
   an elongated body having a length, a proximal end portion and a distal end portion; and
   an optical guide extending along the length of the elongated body,
   wherein the optoelectronic device is in optical communication with the optical guide, the optoelectronic device being arranged in the distal end portion of the elongated body.

10. The apparatus of claim 1, further comprising:
    a light source configured to generate an optical beam, wherein the light source is disposed remote from the optoelectronic device; and
    an optical guide arranged in optical communication with the light source for guiding the optical beam from the light source to the optoelectronic device in a forward direction, and in optical communication with the optoelectronic device for guiding the optical pulses from the optoelectronic device in a return direction.

11. The apparatus of claim 10, further comprising a photodetector arranged to receive the optical pulses from the optical guide.

12. An apparatus, comprising:
    an optical converter circuit comprising an optoelectronic device;
    an electronic appliance generating data; and
    circuitry configured to control the optoelectronic device and the electronic appliance,
    the optoelectronic device being configured to, upon receiving an incoming optical beam, convert the optical beam into electrical energy,
    the optoelectronic device being further configured to emit optical pulses, wherein emission of the optical pulses is induced by the incoming optical beam through photo-induced electro-luminescence (PIEL), the optical pulses based on photo-induced electro-luminescence comprise the data generated by the electronic appliance,
    wherein the circuitry is configured to modulate the data onto the optoelectronic device according to a multiple signal-level coding scheme causing the optoelectronic device to emit the optical pulses in more than two different levels of a discrete set of optical intensities, and
    wherein the circuitry comprises one of: a plurality of sub-circuitries according to the number of the levels of the multi-level coding scheme, each sub-circuitry providing an individual electrical load to the optoelectronic device; and a number of current sources connected to the optoelectronic device, each current source being configured to be switched on and off individually.

13. The apparatus of claim 12, comprising the plurality of sub-circuitries, wherein each or at least some of the sub-circuitries has/have an energy storing element of its own for storing electrical energy converted by the optoelectronic device from the incoming optical beam.

14. The apparatus of claim 12, further comprising:
    an elongated body having a length, a proximal end portion and a distal end portion; and
    an optical guide extending along the length of the elongated body,
    wherein the optoelectronic device is in optical communication with the optical guide, the optoelectronic device being arranged in the distal end portion of the elongated body.

15. The apparatus of claim 12, further comprising:
    a light source configured to generate an optical beam, wherein the light source is disposed remote from the optoelectronic device; and
    an optical guide arranged in optical communication with the light source for guiding the optical beam from the light source to the optoelectronic device in a forward direction, and in optical communication with the optoelectronic device for guiding the optical pulses from the optoelectronic device in a return direction.

16. A method of supplying energy to, and returning data from, a remote electronic appliance, the method comprising:
providing an optical transceiver comprising an optical converter circuit having an optoelectronic device, an electronic appliance, and circuitry configured to control the optoelectronic device and the electronic appliance supplying optical energy to the optical transceiver;
converting by the optical transceiver the optical energy into electrical energy;
varying or segmenting an electrical load on the optoelectronic device into a discrete set of different electrical-load levels to generate a plurality of different levels of optical intensities of the optical pulses; and
returning optical pulses generated by the transceiver based on photo induced electro-luminescence with more than two different levels of the plurality of different levels of optical intensities from the optical transceiver, the optical pulses comprising data generated by the electronic appliance.

17. The method of claim 16, comprising varying the electrical load in a limited range around a working point of the optoelectronic device.

18. The method of claim 16, wherein supplying the optical energy to the optical transceiver comprises:
providing a light source configured to generate an optical beam, wherein the light source is disposed remote from the optoelectronic device; and
guiding the optical beam from the light source to the optical transceiver in a forward direction via an optical guide.

19. The method of claim 16, further comprising guiding the optical pulses from the optical transceiver in a return direction via the optical guide.

* * * * *